(12) United States Patent
Aota

(10) Patent No.: US 7,795,856 B2
(45) Date of Patent: Sep. 14, 2010

(54) REFERENCE VOLTAGE GENERATOR AND VOLTAGE REGULATOR INCORPORATING SAME

(75) Inventor: Hideyuki Aota, Himeji (JP)

(73) Assignee: Ricoh Company, Ltd., Tokyo (JP)

( * ) Notice: Subject to any disclaimer, the term of this patent is extended or adjusted under 35 U.S.C. 154(b) by 293 days.

(21) Appl. No.: 12/128,222

(22) Filed: May 28, 2008

(65) Prior Publication Data
US 2008/0297132 A1 Dec. 4, 2008

(30) Foreign Application Priority Data
May 28, 2007 (JP) ............... 2007-140314

(51) Int. Cl.
G05F 3/16 (2006.01)
G05F 3/20 (2006.01)
(52) U.S. Cl. .............. 323/312; 323/313; 327/538; 327/539
(58) Field of Classification Search ......... 323/312, 323/313; 327/538, 539
See application file for complete search history.

(56) References Cited

U.S. PATENT DOCUMENTS

| | | | | |
|---|---|---|---|---|
| 4,677,323 A * | 6/1987 | Marsh | .............. | 327/416 |
| 6,534,806 B1 * | 3/2003 | Wert | .............. | 257/213 |
| 6,831,498 B2 * | 12/2004 | Marsh | .............. | 327/530 |
| 6,853,236 B1 * | 2/2005 | Lee et al. | .............. | 327/436 |
| 7,205,837 B2 * | 4/2007 | Cohen | .............. | 330/253 |
| 7,576,613 B2 * | 8/2009 | Jung et al. | .............. | 330/311 |

FOREIGN PATENT DOCUMENTS

JP 2007-66043 3/2007

* cited by examiner

Primary Examiner—Bao Q Vu
(74) Attorney, Agent, or Firm—Dickstein Shapiro LLP

(57) ABSTRACT

A reference voltage generator includes a first field effect transistor with n-type heavily doped gate structure and a second field effect transistor with p-type heavily doped gate structure. The first transistor is configured to have a gate and a substrate gate connected to ground, one terminal connected to a voltage supply, and another terminal connected to an output node. The second transistor is configured to have a gate and one terminal connected to the output node, and a substrate gate and another terminal connected to ground. The output node outputs a given reference voltage when voltage is supplied from the voltage supply. A voltage regulator that generates a constant voltage based on a given reference voltage incorporates the reference voltage generator.

16 Claims, 9 Drawing Sheets

REFERENCE VOLTAGE GENERATOR AND VOLTAGE REGULATOR INCORPORATING SAME

CROSS-REFERENCE TO RELATED APPLICATIONS

This application claims priority from Japanese Patent Application No. 2007-140314, filed on May 28, 2007 in the Japanese Patent Office, the entire contents of which are incorporated by reference herein.

FIELD OF THE INVENTION

The present invention relates to a reference voltage generator and a voltage regulator incorporating the same, and more particularly, to a reference voltage generator that generates a reference voltage based on a difference in threshold voltage between a pair of field effect transistors (FETs), and a voltage regulator incorporating the reference voltage generator.

BACKGROUND OF THE INVENTION

Reference voltage generators are used in electronic systems such as voltage regulators that operate based on a constant reference voltage. Various attempts have been made to provide a stable voltage reference independent of fabrication process, supply voltage, and ambient temperature variations.

One known method for reference voltage generation uses field effect transistors (FETs) with heavily doped gate structures, where a reference voltage is obtained as a difference in threshold voltage between a pair of FET devices. FIG. 1 is a circuit diagram illustrating an example of such a FET-based reference voltage generator 100.

As shown in FIG. 1, the reference voltage generator 100 includes n-channel FETs Ma, Mb, and Mc connected in series between a supply voltage Vcc and a ground voltage GND. The transistors Mb and Mc are coupled at an output node Lxout.

In the reference voltage generator 100, the transistor Ma has a drain connected to Vcc, a gate and source connected together, and a substrate gate connected to GND. The transistor Mb has a drain connected to the source of the transistor Ma and a gate, source, and substrate gate connected to the output node Lxout. The transistor Mc has a gate and drain connected to the output node Lxout and a source and substrate gate connected to GND.

The n-FETs Ma, Mb, and Mc are each formed in a p-well of an n-type semiconductor substrate. The transistor Ma is a depletion mode transistor. The n-FETs Mb and Mc have heavily doped gate structures, n-type for the transistor Mb and p-type for the transistor Mc, with different threshold voltages but substantially uniform substrate impurity and channel doping concentrations.

When supplied with Vcc, the reference voltage generator 100 outputs a reference voltage Vref at the output node Lxout, where the depletion mode transistor Ma serves to stabilize the voltage supplied to the series transistors Mb and Mc, and the transistor Mb acts as a constant current source so that the series transistors Ma, Mb, and Mc conduct a same drain current.

In such a configuration, the reference voltage Vref is given by the following equation.

$$Vref = Vth_{MC} - (K_{Mb}/K_{Mc})^{1/2} \cdot Vth_{Mb} \qquad \text{Equation (a)}$$

where $K_{Mb}$ represents device transconductance for Mb, $K_{Mc}$ represents device transconductance for Mc, $Vth_{Mb}$ represents threshold voltage of Mb, and $Vth_{Mc}$ represents threshold voltage of Mc.

When the transistors Mb and Mc have equal transconductance, i.e., $K_{Mb} = K_{Mc}$, Equation (a) can be rewritten as follows:

$$Vref = Vth_{Mc} - Vth_{Mb} \qquad \text{Equation (b)}$$

In this case, the reference voltage Vref equals the difference between $Vth_{Mb}$ and $Vth_{Mc}$, which is in turn equal to the difference in gate-to-source voltage Vgs between the series transistors Mb and Mc. By setting an identical transconductance parameter for the series transistors Mb and Mc, the reference voltage generator 100 generates a constant output which is less sensitive to fabrication process and supply voltage variations.

Additionally, the reference voltage generator 100 achieves good thermal stability in a configuration where the transistors Mb and Mc have aspect ratios (i.e., width-to-length ratios of the channel) adjusted with respect to each other. The reference voltage generator 100 with such a configuration can generate a reference voltage substantially independent of fabrication process, supply voltage, and ambient temperature variations.

Referring to FIG. 2, a plot of the reference voltage Vref versus the supply voltage Vcc in the reference voltage generator 100 is described.

As shown in FIG. 2, the reference voltage Vref becomes constant at approximately 1 volt when the supply voltage Vcc is sufficient. Naturally, this 1-volt output voltage requires a corresponding input voltage for proper functioning of the circuit.

FIG. 3 shows simulated plots of the drain current id versus the drain-to-source voltage Vd for the transistors Mb and Mc, respectively, where the intersection of the two I-V curves indicates an operating point of the reference voltage generator 100, which is approximately 1 volt.

As can be seen from FIGS. 2 and 3, a supply voltage of at least 1 volt is required to drive the reference voltage generator 100, which does not meet today's low voltage and low power consumption requirements. Hence, what is needed is a reference voltage generator that is operable at low voltages, and can generate a reference voltage substantially independent of fabrication process, supply voltage, and ambient temperature variations.

SUMMARY OF THE INVENTION

This patent specification describes a novel reference voltage generator that generates a reference voltage based on a difference in threshold voltage between a pair of field effect transistors (FETs).

In one embodiment, the novel reference voltage generator includes a first field effect transistor with n-type heavily doped gate structure and a second field effect transistor with p-type heavily doped gate structure. The first transistor is configured to have a gate and a substrate gate connected to ground, one terminal connected to a voltage supply, and another terminal connected to an output node. The second transistor is configured to have a gate and one terminal connected to the output node, and a substrate gate and another terminal connected to ground. The output node outputs a given reference voltage when voltage is supplied from the voltage supply.

This patent specification also describes a novel voltage regulator that generates a constant voltage based on a given reference voltage.

In one embodiment, the novel voltage regulator includes a reference voltage generator. The reference voltage generator is configured to generate the given reference voltage, and includes a first field effect transistor with n-type heavily doped gate structure and a second field effect transistor with p-type heavily doped gate structure. The first transistor is configured to have a gate and a substrate gate connected to ground, one terminal connected to a voltage supply, and another terminal connected to an output node. The second transistor is configured to have a gate and one terminal connected to the output node, and a substrate gate and another terminal connected to ground. The output node outputs a given reference voltage when voltage is supplied from the voltage supply.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
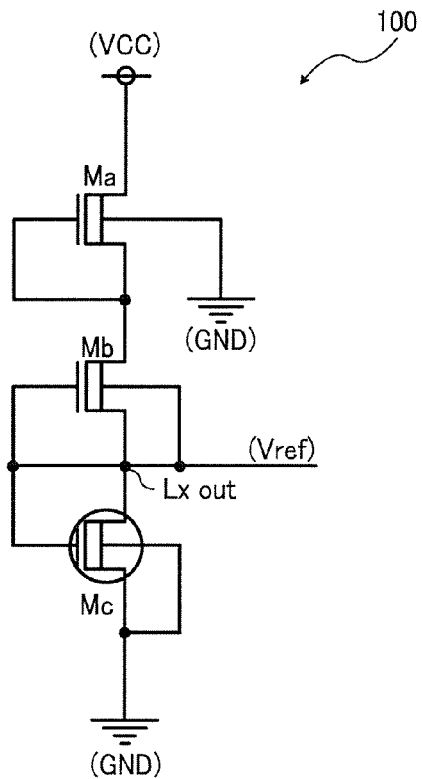
FIG. 1 is a circuit diagram illustrating an example of a conventional reference voltage generator.
Figure 2:
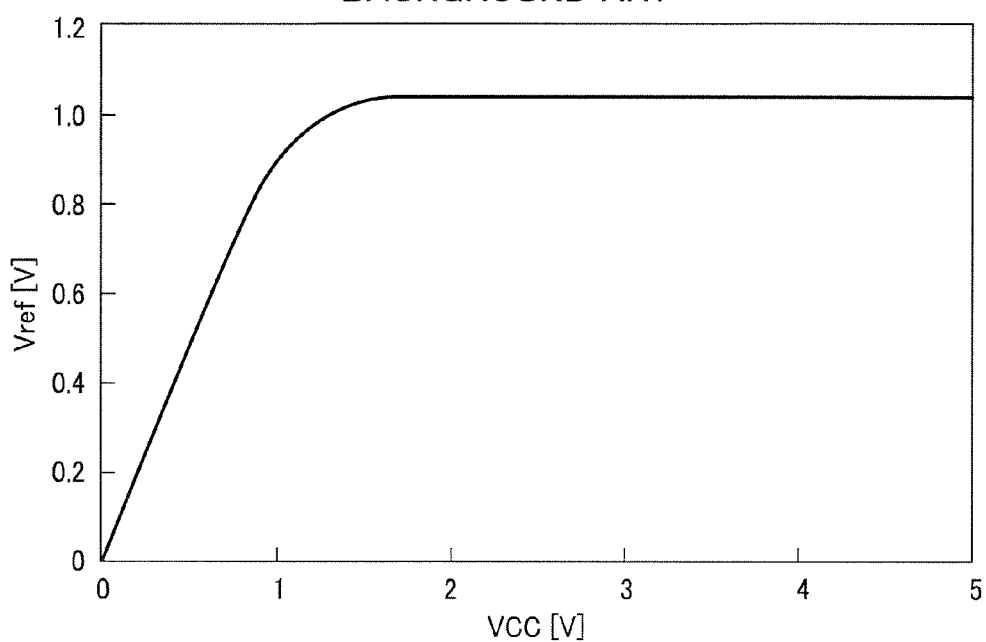
FIG. 2 is a plot of a reference voltage versus a supply voltage in the reference voltage generator of FIG. 1.
Figure 3:
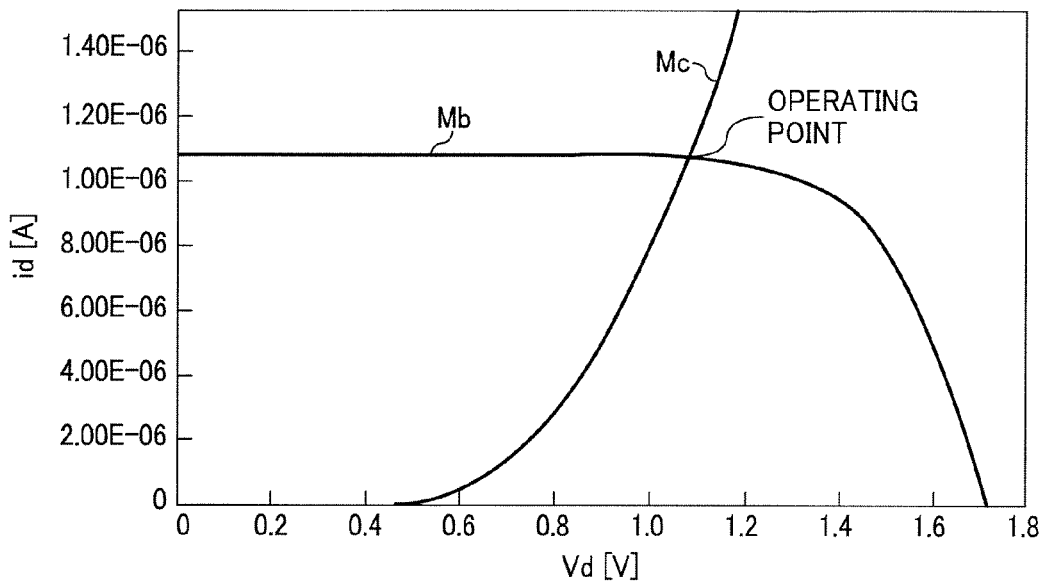
FIG. 3 shows simulated plots of a drain current versus a drain-to-source voltage for field effect transistors used in the reference voltage generators of FIG. 1.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, example embodiments of this patent specification are described.

Figure 4:
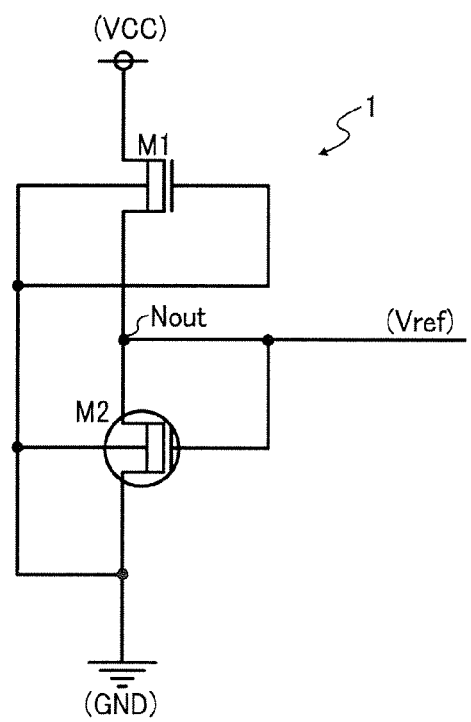
FIG. 4 is a circuit diagram illustrating a reference voltage generator according to an embodiment of this patent specification.

FIG. 4 is a circuit diagram illustrating a reference voltage generator 1 according to an embodiment of this patent specification. As shown in FIG. 4, the reference voltage generator 1 includes first and second n-channel field effect transistors (FETs) M1 and M2 connected in series between a supply voltage Vcc and a ground voltage GND. The transistors M1 and M2 are coupled at an output node Nout.

In the reference voltage generator 1, the first transistor M1 has a drain connected to Vcc, a source connected to the output node Nout, and a gate and substrate gate connected to GND. The second transistor M2 has a drain and gate connected to the output node Nout, and a source and substrate gate connected to GND.

The n-FETs M1 and M2 are each formed in a p-well of an n-type semiconductor substrate with heavily doped gate structures, n-type for the transistor M1 and p-type for the transistor M2, and have different threshold voltages but substantially uniform substrate impurity and channel doping concentrations.

When supplied with Vcc, the reference voltage generator 1 outputs a reference voltage Vref from the output node Nout, where the first transistor M1 acts as a constant current source so that the transistors M1 and M2 conduct a same drain current.

In such a configuration, the reference voltage Vref is given by the following equation.

$$Vref = Vth_{M2} - (K_{M1}/K_{M2})^{1/2} * Vth_{M1} \qquad \text{Equation (1)}$$

where $K_{M1}$ represents device transconductance for M1, $K_{M2}$ represents device transconductance for M2, $Vth_{M1}$ represents threshold voltage of M1, and $Vth_{M2}$ represents threshold voltage of M2.

When the transistors M1 and M2 have equal transconductance, i.e., $K_{M1} = K_{M2}$, Equation (1) can be rewritten as follows:

$$Vref = Vth_{M2} - Vth_{M1} \qquad \text{Equation (2)}$$

In this case, the reference voltage Vref equals the difference between $Vth_{M2}$ and $Vth_{M1}$, which is in turn equal to the difference in gate-to-source voltage Vgs between the series transistors M1 and M2.

Figure 5:
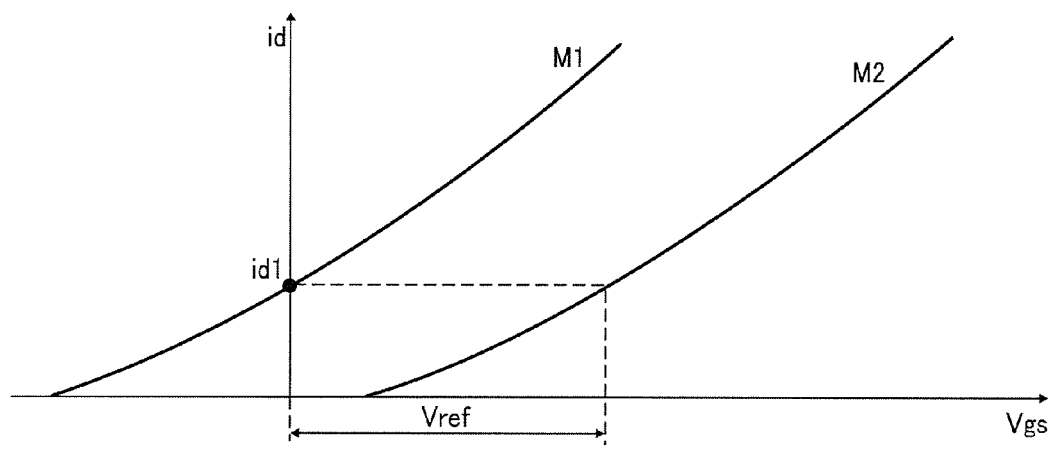
FIG. 5 shows plots of a drain current versus a gate-to-source voltage Vgs for field effect transistors used in the reference voltage generator of FIG. 4.

FIG. 5 shows plots of a drain current id versus a gate-to-source voltage Vgs for the transistors M1 and M2, respectively. As shown in FIG. 5, when the current source transistor M1 conducts a drain current id1 at a particular voltage, the same current id1 flows in the transistor M2 at a different voltage, and this difference in the gate-to-source voltage Vgs is output as the reference voltage Vref in the reference voltage generator 1.

Figure 6:
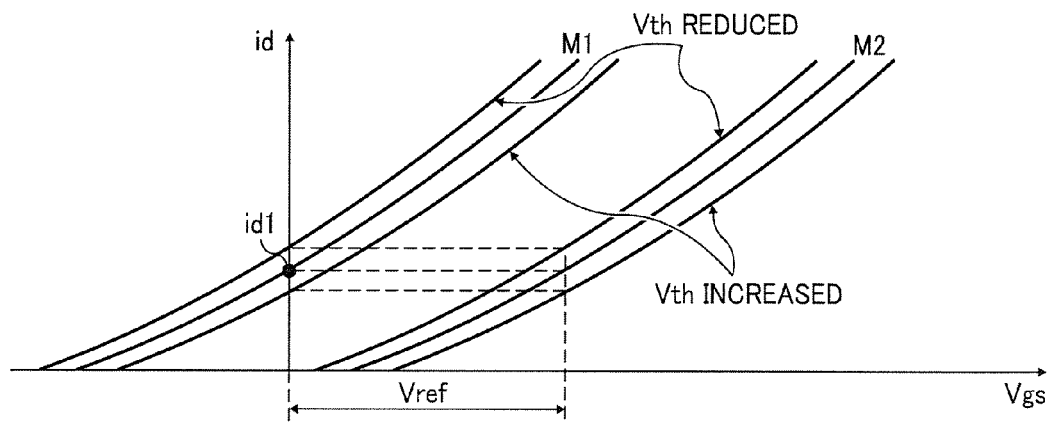
FIG. 6 shows the id-Vgs plots for the transistors of FIG. 5 with threshold voltage changed by process variations.

The id-Vgs characteristics shown in FIG. 5 can be affected by variations in the process parameters, such as substrate impurity and channel doping concentrations, which cause a decrease or increase in the device threshold voltages. FIG. 6 shows the id-Vgs characteristics of the first and second transistors M1 and M2, respectively, with such threshold voltage changes induced by process variations.

Note that the two characteristic curves in FIG. 6 shift to the left (threshold voltages reduced) or to the right (threshold voltages increased) by an equal amount without changing the curve shapes. Such similar shifts of the process-induced characteristics result from the fabrication process of the reference voltage generator 1, in which the transistors M1 and M2 are constructed on a single semiconductor substrate through substantially the same process, that is, with substantially the same process variations.

As is obvious from FIG. 6, the reference voltage Vref remains substantially unchanged in the presence of process variations causing the threshold voltage changes. Moreover, the stability of the reference voltage Vref in the reference voltage generator 1 has been confirmed experimentally where measured variations in the reference voltage Vref fall within approximately ±1% of a nominal value.

Figure 7:
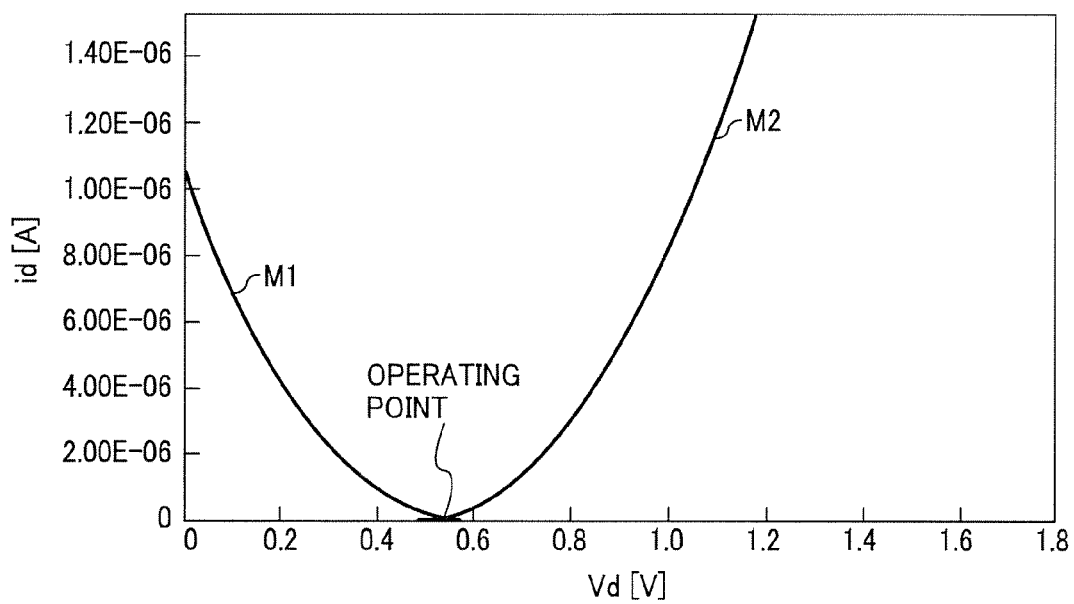
FIG. 7 shows simulated plots of a drain current versus a drain-to-source voltage for the transistors of FIG. 5.

The reference voltage generator 1 described above is particularly well adapted for operation at relatively low voltages. FIG. 7 shows simulated plots of the drain current id versus the drain-to-source voltage Vd for the transistors M1 and M2, respectively. As shown in FIG. 7, the second transistor M2 starts conducting at a voltage slightly lower than 0.6 volts, progressively increasing the drain current as the drain voltage increases, while the first transistor M1 is cut off when the drain voltage exceeds approximately 0.6 volts. Namely, the drain current of the transistor M1, which has the gate connected to GND, drastically decreases as the drain voltage increases to reach the cutoff point. As a result, the two I-V curves intersect at approximately 0.6 volts, indicating an operating point of the reference voltage generator 1. The operating voltage of 0.6 volts is advantageously low compared to a configuration with the current source transistor (corresponding to the transistor M1) having a gate connected to a reference output node, which requires an operating voltage of approximately 1 volt or higher.

Figure 8:
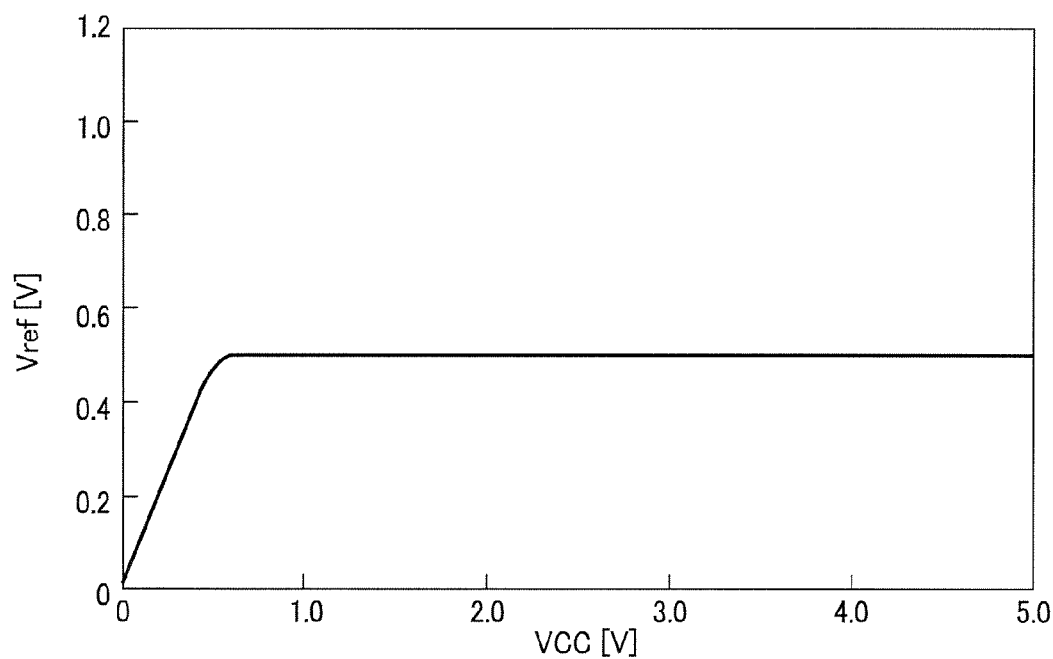
FIG. 8 shows a relation between a supply voltage and a reference voltage in the reference voltage generator of FIG. 4.

The low operating voltage of the reference voltage generator 1 accompanies a corresponding reduction in the reference voltage Vref. FIG. 8 shows a relation between the supply voltage Vcc and the reference voltage Vref in the reference voltage generator 1. As shown in FIG. 8, the reference voltage Vref becomes constant at approximately 0.5 volts, which is significantly lower than that achievable by the circuit configuration requiring the 1-volt operating voltage.

Figure 9:
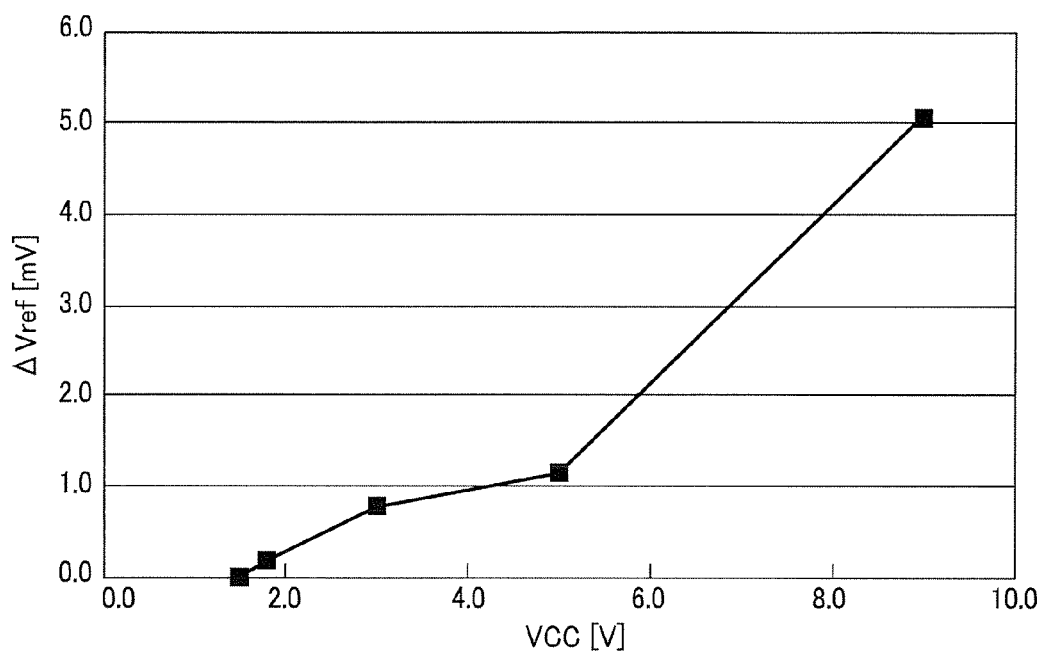
FIG. 9 is a plot of variation in the reference voltage observed when the supply voltage is varied in the reference voltage generator of FIG. 4.

Referring to FIG. 9, a plot of variation in the reference voltage Vref observed when the supply voltage Vcc is varied in the reference voltage generator 1 is depicted.

Note that the reference voltage generator 1 is designed to operate using relatively low supply voltages, i.e., approximately 2 volts at most. The data shows that the variation in Vref for Vcc=2 is approximately 0.3 millivolts, which indicates good stability of the reference voltage generator 1 under low voltage conditions.

In addition to being substantially independent of process and temperature variations and operable at relatively low voltages, the reference voltage generator 1 is less sensitive to temperature changes because the first and second transistors M1 and M2 have similar thermal properties with respect to the potential drop in the channel region or the device transconductance. Even so, the reference voltage Vref still has a temperature coefficient of approximately −500 parts per million per degree centigrade (ppm/° C.) due to temperature dependence of work function of the gates of the FET devices.

To effect temperature independence of the reference voltage Vref in the reference voltage generator 1, it is preferable that the first and second FETs M1 and M2 have channel regions dimensioned relative to each other.

Specifically, when the first transistor M1 has an aspect ratio S1=W1/L1 and the second transistor M2 has an aspect ratio S2=W2/L2, a size ratio S2/S1 is set in a particular range, determined, for example, empirically to effectively reduce the temperature coefficient of the reference voltage Vref. In this patent specification, the aspect ratio (S) refers to a ratio of width (W) to length (L) of a channel region of a FET device.

Figure 10:
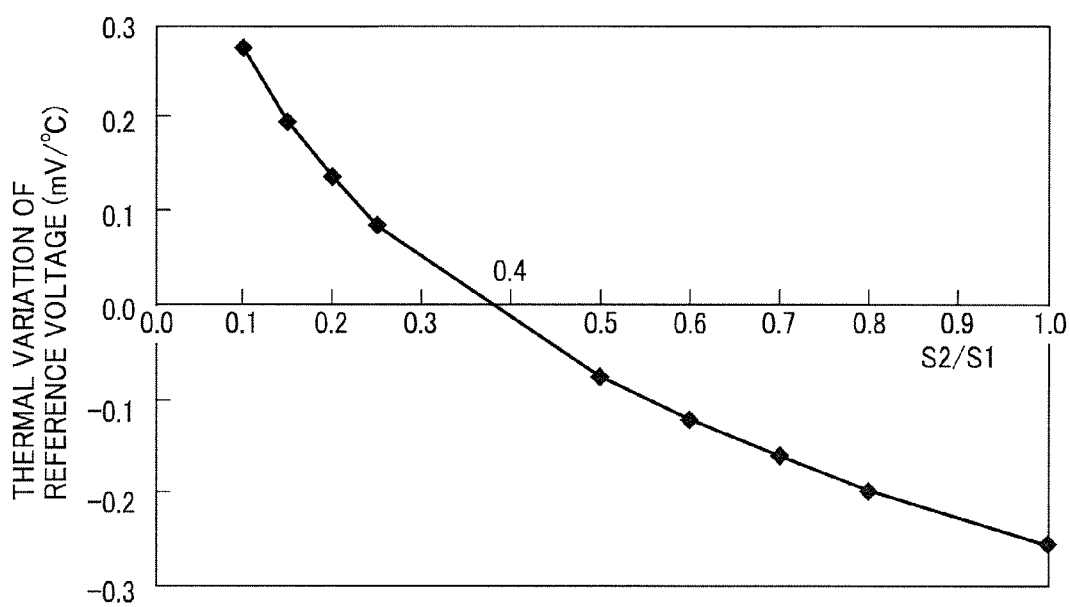
FIG. 10 shows a plot of temperature-induced variation in the reference voltage observed in the reference voltage generator of FIG. 4.

FIG. 10 shows a plot of temperature-induced variation in the reference voltage Vref observed when the size ratio S2/S1 is varied. The data was obtained experimentally by changing only the channel lengths of the transistors used while keeping constant the channel widths thereof.

As shown in FIG. 10, the thermal variation in the reference voltage Vref is effectively suppressed when the ratio S2/S1 lies in the range of approximately 0.25 to approximately 0.60, and expected to be minimal when the ratio S2/S1 is in the range of approximately 0.36 to approximately 0.40. Moreover, it has been revealed that setting the size ratio S2/S1 between 0.36 and 0.40 can reduce the temperature coefficient of the reference voltage Vref to approximately 40 ppm/° C. in the reference voltage generator 1.

Figure 11:
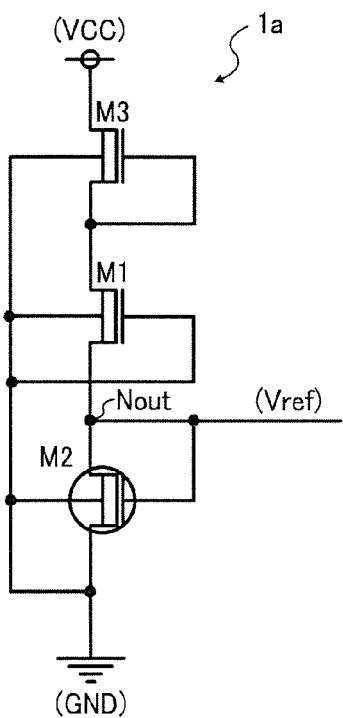
FIG. 11 is a circuit diagram illustrating a reference voltage generator according to another embodiment of this patent specification.

Referring now to FIG. 11, a circuit diagram illustrating a reference voltage generator 1a according to another embodiment of this patent specification is described.

As shown in FIG. 11, the reference voltage generator 1a is configured in a manner similar to that described in FIG. 4, except that an additional n-channel FET M3 is inserted so that the transistors M3, M1, and M2 form a series circuit between Vcc and GND.

In the reference voltage generator 1a, the transistor M3 is a depletion mode transistor formed in a p-well of an n-type semiconductor substrate, and has a drain connected to Vcc, a gate and source connected to the drain of the transistor M1, and a substrate gate connected to GND.

During operation, the reference voltage generator 1a generates the reference voltage Vref in a manner similar to that described for the reference voltage generator 1, where the first transistor M1 acts as a constant current source so that the transistors M1 through M3 conduct a same drain current.

In such a configuration, the transistor M3 generates a constant voltage at the source thereof so as to stabilize the voltage supplied to the transistors M1 and M2.

Figure 12:
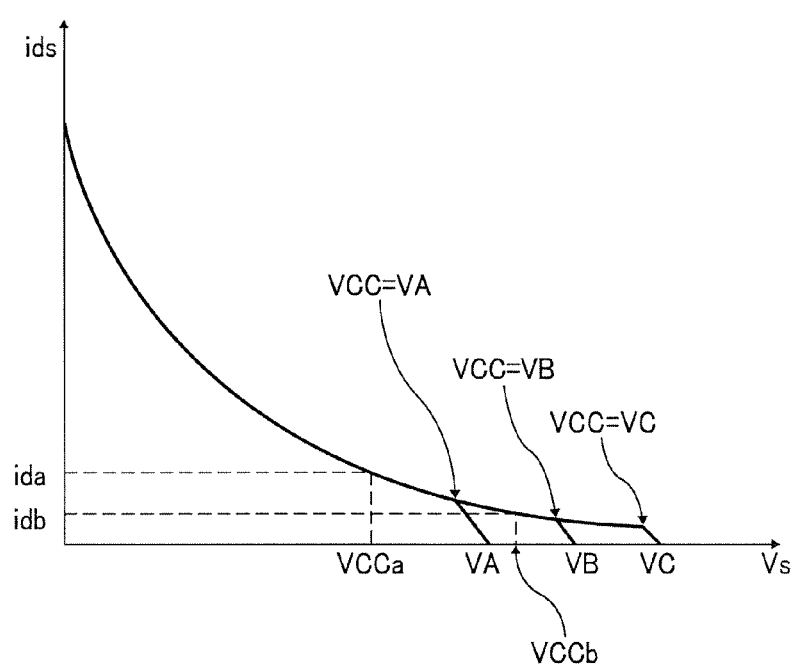
FIG. 12 shows current-voltage characteristics of a source of an additional field effect transistor in the reference voltage generator of FIG. 11.

FIG. 12 shows current-voltage characteristics of the source of the transistor M3, where the drain-to-source current ids is plotted against the source voltage Vs for different values VA, VB, and VC of the supply voltage Vcc in the reference voltage generator 1a.

As shown in FIG. 12, for a particular supply voltage, the source current ids decreases as the source voltage Vs increases, then steeply declines as Vs approaches the supply voltage and reaches 0 when Vs equals the particular supply voltage. Note that the ids-Vs curves for Vcc=VA, Vcc=VB, and Vcc=VC coincide with each other before beginning the steep declines, indicating that, for a particular source current, the source voltage Vs is held constant regardless of changes in the supply voltage Vcc in the reference voltage generator 1a.

For example, when the transistor M3 has a sufficiently large source current ida, the source voltage Vs is constant at Vcca regardless of whether the supply voltage Vcc is VA, VB, or VC. Assuming that the source current ida is the constant current supplied from the current source transistor M1 in the reference voltage generator 1a, this maintains the voltage supplied to the transistors M1 and M2 at Vcca even when the supply voltage Vcc fluctuates during operation.

Consider a case where the transistor M3 has a relatively small source current idb. For Vcc=VB or Vcc=VC, the transistor M3 generates a constant source voltage Vccb which is greater than VA. However, for Vcc=VA, the transistor M3 has no longer the same source voltage Vccb since the source voltage Vs does not exceed the supply voltage Vcc. To ensure proper operation of the reference voltage generator 1a, it is desirable to set the current and voltage at the source of the transistor M3 according to the minimum operating voltage. Such setting can be readily done by tuning the channel aspect ratio of the transistor M3.

With the transistor M3 thus provided, the source-to-drain voltages for the transistors M1 and M2 are given as follows:

$$Vds_{M1} = Vcc1 - Vref$$

$$Vds_{M2} = Vref \qquad \text{Equation (3)}$$

where Vcc1 represents source voltage of the transistor M3, $Vds_{M1}$ represents drain-to-source voltage of the transistor M1, and $Vds_{M2}$ represents drain-to-source voltage of the transistor M2.

Hence, the transistors M1 and M2 each has the drain-to-source voltage independent of the supply voltage Vcc, thereby generating the reference voltage Vref substantially independent of the supply voltage Vcc in the reference voltage generator 1a.

Figure 13:
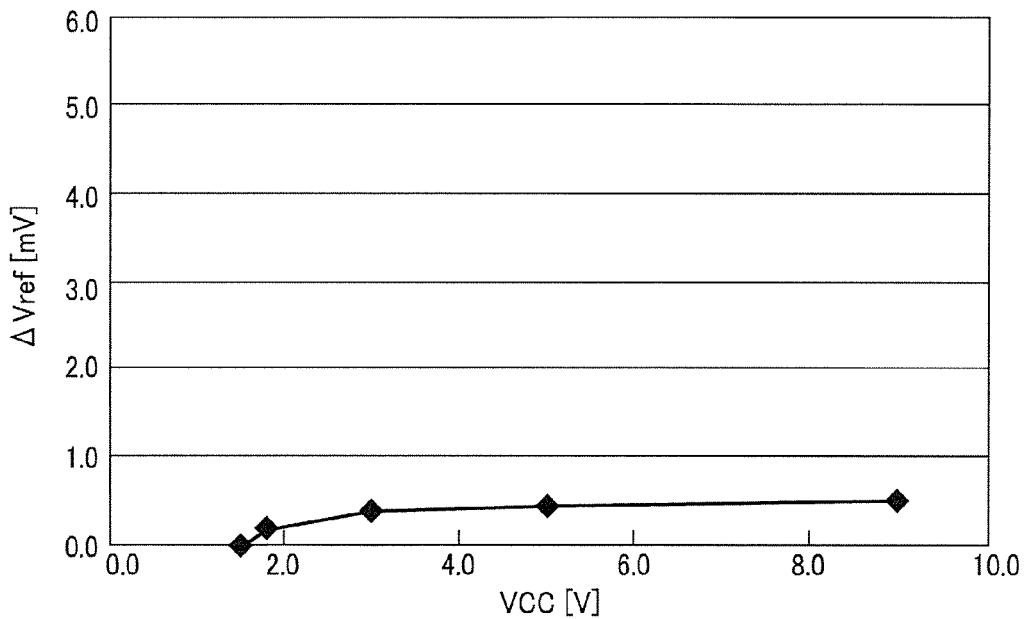
FIG. 13 shows a plot of variation in a reference voltage observed when the supply voltage is varied in the reference voltage generator of FIG. 11.

FIG. 13 shows a plot of variation in the reference voltage Vref observed when the supply voltage Vcc is varied in the reference voltage generator 1a.

As shown in FIG. 13, the reference voltage Vref obtained by the reference voltage generator 1a has better stability than the configuration depicted in FIG. 4 (see FIG. 9). Namely, the reference voltage variation is approximately 0.2 millivolts for Vcc=2 and approximately 0.4 millivolts for Vcc=9, which is several times smaller than that achieved without the transistor M3, indicating very good stability of the reference voltage generator 1a under low voltage conditions.

In the reference voltage generator according to this patent specification, a further reduction in the reference voltage Vref may be provided by an arrangement in which the transistor M2 has the channel region additionally doped with impurities to reduce the threshold voltage $Vth_{M2}$. Although sacrificing similarity in physical properties between the transistors M1 and M2, such an arrangement is advantageous when an extremely low reference voltage is needed.

Figure 14:
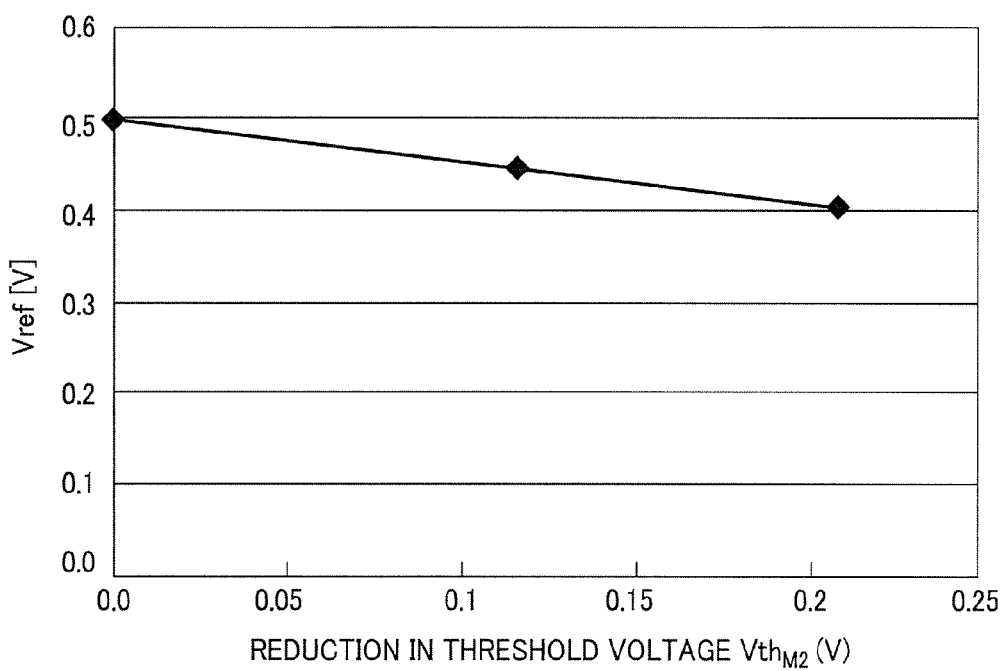
FIG. 14 provides experimental results showing effect of reduction in a transistor threshold voltage on the reference voltage according to this patent specification.

FIG. 14 provides experimental results showing effect of reduction in the threshold voltage $Vth_{M2}$ on the reference voltage Vref, where the threshold voltage $Vth_{M2}$ is reduced by additionally doping the transistor channel. As shown in FIG. 14, reducing $Vth_{M2}$ by approximately 0.11 volts lowers Vref to approximately 0.45 volts, and reducing $Vth_{M2}$ by approximately 0.11 volts lowers Vref to approximately 0.39 volts. The reduced amount of Vref for each case is approximately 50 millivolts and approximately 110 millivolts, respectively, which can correspondingly reduce the operating voltage of the reference voltage generator.

Thus, the reference voltage generator according to this patent specification is operable at relatively low voltages, and can generate a reference voltage substantially independent of fabrication process, supply voltage, and ambient temperature variations. The circuit topology is particularly applicable to processes where component transistors are each constructed with a substrate gate connected to ground, which may translate into a reduced size of the reference voltage generator, since connecting the substrate gates in common does not require spacing between adjacent transistors.

The following discussion describes embodiments of voltage regulators incorporating the reference voltage generator according to this patent specification. It should be noted that, although the reference numeral "1" is used hereinbelow to refer to the reference voltage generator, any one or combination of the embodiments described hereinabove may be employed in the voltage regulators according to this specification.

Figure 15:
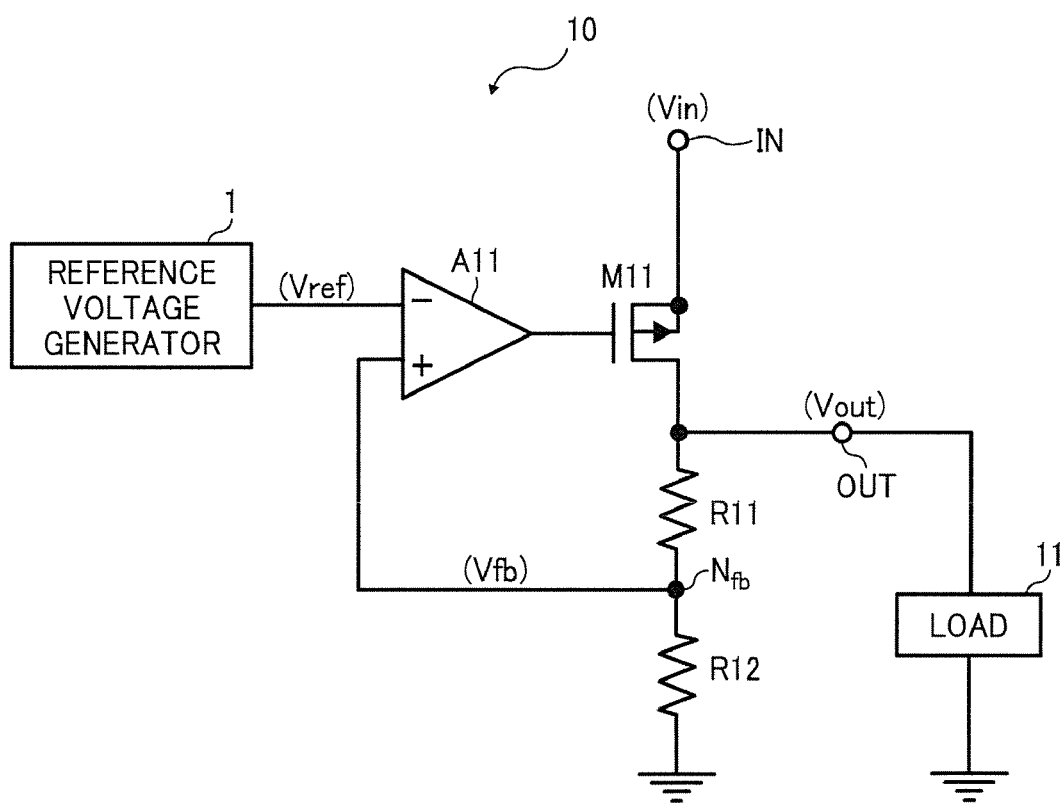
FIG. 15 is a circuit diagram illustrating a series voltage regulator according to one embodiment of this patent specification.

Referring now to FIG. 15, a circuit diagram illustrating a series voltage regulator 10 according to one embodiment of this patent specification is described.

As shown in FIG. 15, the voltage regulator 10 includes a p-channel MOS transistor M11, resistors R11 and R12, an error amplifier A11, an input terminal IN, an output terminal OUT, and the reference voltage generator 1. The input terminal IN is connected to a power supply, not shown, and the output terminal OUT is connected to a load circuit 11.

In the voltage generator 10, the transistor M11 is connected between the input terminal IN and the output terminal OUT. The resistors R11 and R12 are connected in series between the output terminal OUT and ground, forming a divider node Nfb therebetween. The error amplifier A11 has an inverting input connected to the reference voltage generator 1, a non-inverting input connected to the divider node Nfb, and an output connected to a gate of the transistor M11.

During operation, the voltage generator 10 regulates an input voltage Vin at the input terminal IN to generate a constant voltage Vout at the output terminal OUT. The resistors R11 and R12 generate a feedback voltage Vfb at the node Nfb based on the output voltage Vout. The reference voltage generator 1 generates the reference voltage Vref in the manner described hereinabove. The voltages Vfb and Vref, respectively, are applied to the error amplifier A11.

Receiving the inputs Vfb and Vref, the error amplifier A11 controls operation of the transistor M11 so that the feedback voltage Vfb meets the reference voltage Vref. The output voltage Vout thus maintained substantially constant is supplied to drive the load circuit 11.

Figure 16:
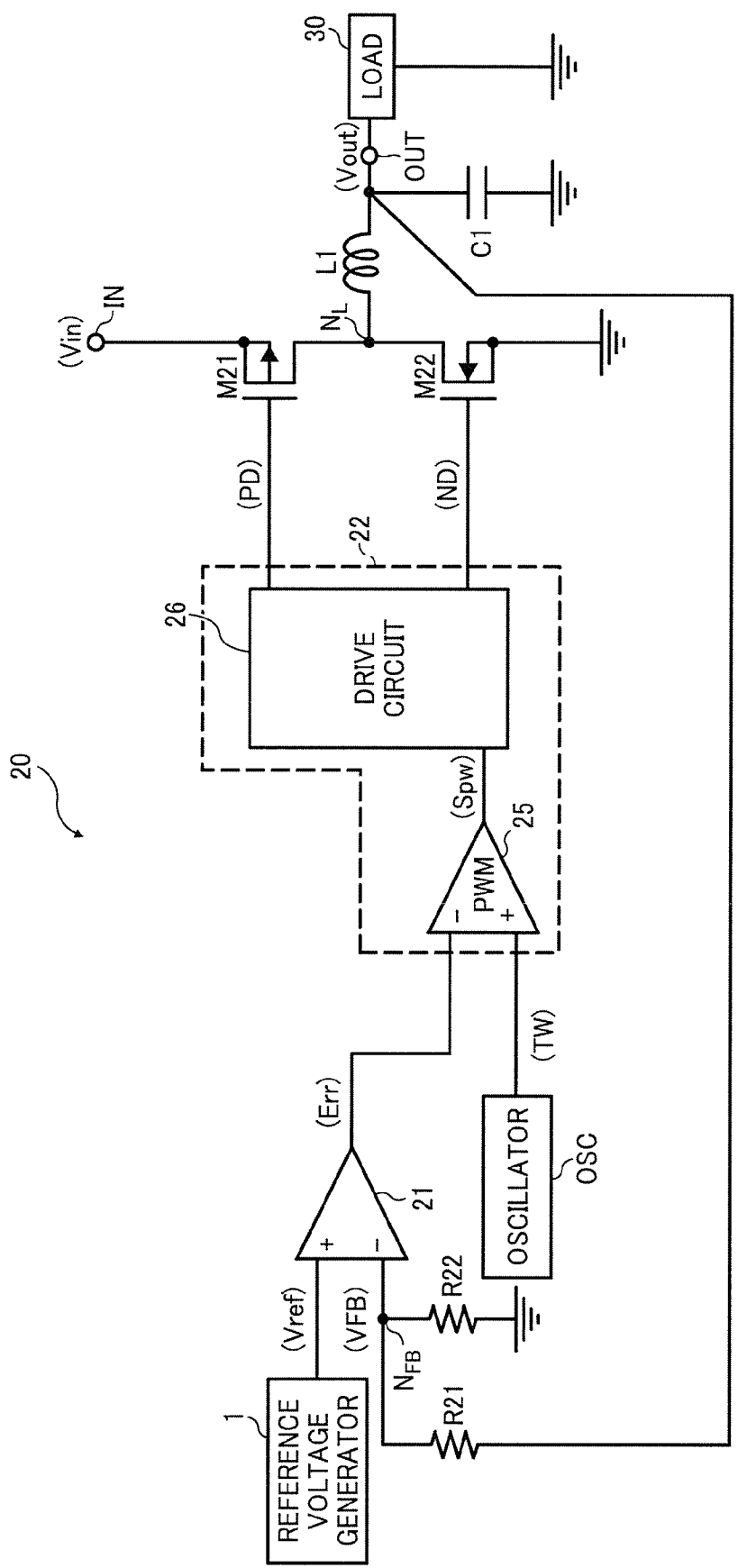
FIG. 16 is a circuit diagram illustrating a switching voltage regulator according to another embodiment of this patent specification.

Referring now to FIG. 16, a circuit diagram illustrating a switching voltage regulator 20 according to another embodiment of this patent specification is described.

As shown in FIG. 16, the voltage regulator 20 includes a switching transistor M21, a synchronous rectifier transistor M22, an inductor L1, a capacitor C1, resistors R21 and R22, an input terminal IN, and an output terminal OUT. Further, the voltage regulator 20 includes the reference voltage generator 1, an error amplifier 21, an oscillator circuit OSC, and a control circuit 22. The control circuit 22 includes a pulse width modulation (PWM) comparator 25 and a drive circuit 26. The input terminal IN is connected to a power supply, not shown, and the output terminal OUT is connected to a load circuit 30.

In the voltage regulator 20, the transistor M21 is a p-channel MOS transistor and the transistor M22 is an n-channel MOS transistor. The transistor M21 is connected in series with the inductor L1 between the input and output terminals IN and OUT, forming a node NL therebetween. The transistor M22 is connected between the node NL and ground. The capacitor C1 is connected between the output terminal OUT and ground. The resistors R21 and R22 are connected in series between the output terminal OUT and ground, forming a divider node NFB therebetween.

The error amplifier 21 has an inverting input connected to the node NFB, a non-inverting input connected to the reference voltage generator 1, and an output connected to the control circuit 22.

In the control circuit 22, the PWM comparator 25 has an inverting input connected to the error amplifier 21, a non-inverting input connected to the oscillator circuit OSC, and an output connected to the drive circuit 26. The drive circuit 26 is connected to a gate of each of the transistors M21 and M22.

During operation, the voltage generator 20 regulates an input voltage Vin at the input terminal IN to generate a constant voltage Vout at the output terminal OUT. The resistors R21 and R22 monitor the output voltage Vout to output a feedback signal VFB at the divider node NFB. The reference voltage generator 1 generates the reference voltage Vref in the manner described hereinabove. Receiving the inputs VFB and Vref, the error amplifier 21 amplifies a voltage differential therebetween to output an error signal Err to the control circuit 22. The oscillator circuit OSC outputs a given triangle wave signal TW to the control circuit 22.

In the control circuit 22, the PWM comparator 25 compares the error signal Err with the triangle wave signal TW to output a width-modulated pulse signal Spw to the drive circuit 26. The drive circuit 26 outputs a first control signal PD to the transistor M21 and a second control signal ND to the transistor M22 based on the pulse signal Spw.

In accordance with the first and second control signals PD and ND, the transistors M21 and M22 perform switching in a complementary manner to regulate current flowing across the inductor L1. When the transistor M21 is on and the transistor M22 is off, the current flows through the transistor M21 to charge the inductor L1. When the transistor M21 is off and the transistor M22 is on, the inductor L1 discharges the stored energy through the transistor M22. The current thus generated is smoothed by the capacitor C1 and output to the load circuit 30 via the output terminal OUT.

The voltage regulator 20 maintains the output voltage Vout at a constant level using a PWM technique. For example, an increase in the output voltage Vout lowers amplitude of the error signal Err so as to reduce the duty cycle of the pulse signal Spw. This results in a shorter ON time of the transistor M21, which correspondingly decreases the output voltage Vout. Similarly, a decrease in the output voltage Vout raises amplitude of the error signal Err so as to increase the duty cycle of the pulse signal Spw. This results in a longer ON time of the transistor M21, which correspondingly increases the output voltage Vout.

Numerous additional modifications and variations of the present disclosure are possible in light of the above teachings. It is therefore to be understood that, within the scope of the appended claims, the disclosure of this patent specification may be practiced otherwise than as specifically described herein.

What is claimed as new and desired to be protected by Letters Patent of the United States is:

1. A reference voltage generator comprising:
   a first field effect transistor with n-type heavily doped gate structure, the first transistor configured to have a gate and a substrate gate connected to ground, one terminal connected to a voltage supply, and another terminal connected to an output node; and
   a second field effect transistor with p-type heavily doped gate structure, the second transistor configured to have a gate and one terminal connected to the output node, and a substrate gate and another terminal connected to ground,
   the output node outputting a given reference voltage when voltage is supplied from the voltage supply.

2. The reference voltage generator according to claim 1, wherein the second transistor has an aspect ratio smaller than an aspect ratio of the first transistor, the aspect ratio representing a ratio of channel width to channel length of each of the first and second transistors.

3. The reference voltage generator according to claim 2, wherein the aspect ratio of the second transistor is approximately 0.25 to approximately 0.60 times the aspect ratio of the first transistor.

4. The reference voltage generator according to claim 2, wherein the aspect ratio of the second transistor is approximately 0.36 to approximately 0.40 times the aspect ratio of the first transistor.

5. The reference voltage generator according to claim 1, further comprising a third field effect transistor inserted between the voltage supply and the first transistor,
   the third transistor configured to operate in a depletion mode, and have one terminal connected to the voltage supply, a gate and another terminal connected to the one terminal of the first transistor, and a substrate gate connected to ground.

6. The reference voltage generator according to claim 5, wherein the second transistor has an aspect ratio smaller than an aspect ratio of the first transistor, the aspect ratio representing a ratio of channel width to channel length of each of the first and second transistors.

7. The reference voltage generator according to claim 6, wherein the aspect ratio of the second transistor is approximately 0.25 to approximately 0.60 times the aspect ratio of the first transistor.

8. The reference voltage generator according to claim 6, wherein the aspect ratio of the second transistor is approximately 0.36 to approximately 0.40 times the aspect ratio of the first transistor.

9. A voltage regulator that generates a constant voltage based on a given reference voltage, the voltage regulator comprising:
   a reference voltage generator configured to generate the given reference voltage, the reference voltage generator including:
      a first field effect transistor with n-type heavily doped gate structure, the first transistor configured to have a gate and a substrate gate connected to ground, one terminal connected to a voltage supply, and another terminal connected to an output node; and
      a second field effect transistor with p-type heavily doped gate structure, the second transistor configured to have a gate and one terminal connected to the output node, and a substrate gate and another terminal connected to ground,
      the output node outputting the given reference voltage when voltage is supplied from the voltage supply.

10. The voltage regulator according to claim 9, wherein the second transistor has an aspect ratio smaller than an aspect ratio of the first transistor, the aspect ratio representing a ratio of channel width to channel length of each of the first and second transistors.

11. The voltage regulator according to claim 10, wherein the aspect ratio of the second transistor is approximately 0.25 to approximately 0.60 times the aspect ratio of the first transistor.

12. The voltage regulator according to claim 10, wherein the aspect ratio of the second transistor is approximately 0.36 to approximately 0.40 times the aspect ratio of the first transistor.

13. The voltage regulator according to claim 9, where in the reference voltage generator further includes a third field effect transistor inserted between the voltage supply and the first transistor, the third transistor configured to operate in a depletion mode, and have one terminal connected to the voltage supply, a gate and another terminal connected to the one terminal of the first transistor, and a substrate gate connected to ground.

14. The reference voltage generator according to claim 13, wherein the second transistor has an aspect ratio smaller than an aspect ratio of the first transistor, the aspect ratio representing a ratio of channel width to channel length of each of the first and second transistors.

15. The reference voltage generator according to claim 14, wherein the aspect ratio of the second transistor is approximately 0.25 to approximately 0.60 times the aspect ratio of the first transistor.

16. The reference voltage generator according to claim 14, wherein the aspect ratio of the second transistor is approximately 0.36 to approximately 0.40 times the aspect ratio of the first transistor.

* * * * *